Aug. 20, 1946.  K. EISELE  2,406,007
FASTENER
Filed Oct. 15, 1943
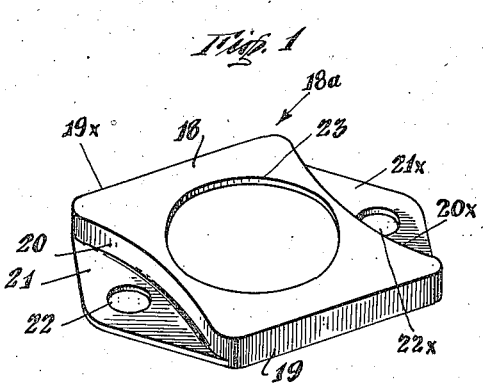
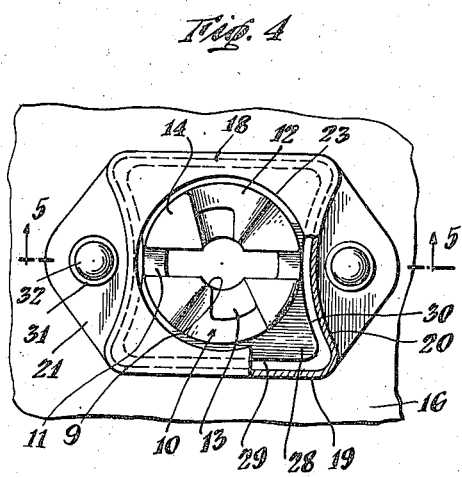
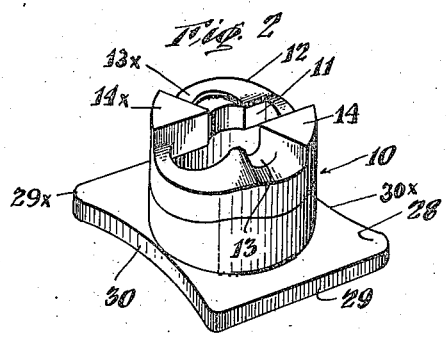
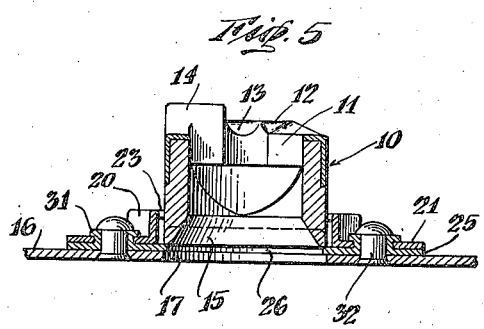
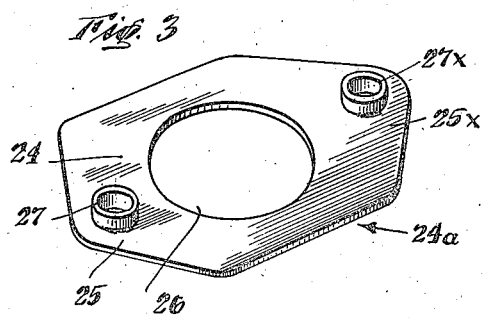
INVENTOR.
Karl Eisele
BY
ATTORNEYS Patented Aug. 20, 1946

2,406,007

UNITED STATES PATENT OFFICE 2,406,007

FASTENER

Karl Eisele, Belleville, N. J., assignor to Camloc Fastener Corporation, New York, N. Y., a corporation of New York Application October 15, 1943, Serial No. 506,391

3 Claims. (Cl. 24—221)

This invention relates to a structurally and functionally improved fastener and in its more specific aspects aims to provide an element of a fastener assembly including, for example, a cam member and which, by means of the present invention, will be "floatingly" supported.

Thus, it is an object of the invention to furnish a unit of this type and which, when in mounted position, will be supported in a manner such that it may be capable of automatically positioning itself with reference to a cooperating element of the fastener assembly. Such cooperating element is ordinarily in the form of a stud member. Accordingly, even if the parts are not mounted in perfect alignment, they will automatically align upon being coupled.

A further object of the invention is that of designing a unit of this type and which, without any sacrifice in strength, or diminution in bearing surfaces will occupy a minimum amount of space aside from the fact that it will also require for its production a minimum amount of material.

Still another object is that of furnishing a fastener element which may readily be mounted upon a member to receive the same, and despite the fact that the fastener will occupy the minimum amount of space.

Another object is that of providing a fastener which—consistent with embodying a maximum amount of strength—will have a structure such that the results and objects enumerated in the foregoing paragraphs will be accomplished; such fastener, moreover, embodying a very simple type of design capable of manufacture by substantially automatic machinery and methods and apart from which the fastener, when once asembled, will operate over long periods of time with freedom from all difficulties.

With these and other objects in mind, reference is had to the attached sheet of drawings illustrating one practical embodiment of the invention, and in which:

Fig. 1 is a perspective view of the housing or shell which forms a part of the fastener element;

Fig. 2 illustrates a fastener element, the parts of which are modified to cooperate with the shell or housing of Fig. 1;

Fig. 3 is a perspective view of the base plate which is associated with the shell;

Fig. 4 is a plan view of the fastener in assembled condition and with certain of the parts broken away to disclose underlying construction; and Fig. 5 is a transverse sectional view taken along the lines 5—5 and in the direction of the arrows as indicated in Fig. 4.

In these views only one element of a fastener assembly has been illustrated. As afore brought out, this has been shown as a cam member or receptacle. The cooperating element has not been shown but preferably is of the type shown in Patent No. 2,315,335.

Thus, referring to the member, it will be seen that the reference numeral 10 indicates the body or collar member thereof, which as shown especially in Fig. 2 is perfectly circular, and formed with a transverse slot 11 extending from its bore 9. The edges 12 of the member are developed to provide cam portions terminating in a "dwell" beyond which recesses or relatively depressed portions 13—13x are provided. In turn beyond these portions, the member material is extended in the form of projections 14—14x furnishing stops.

This member cooperates with a stud of the type afore described by projecting the latter into the bore of the member. Adjacent such receiving end, the inner surface of the member may be flared as indicated by the numeral 15 in Fig. 5. This will provide a guide structure assuring a proper cooperation and entry of the stud into the bore 9 of the member. The cross pin or member carried by the shank will, under continued projection of the stud, pass through the slot 11 and register with the most depressed portions of the cam surfaces 12. Thereafter, by rotating the stud, the cross member or pin will ride against the surfaces and over the "dwell" portion until it comes to lie within the recesses 13—13x. Movement beyond this position is prevented by the stops 14—14x. Under these circumstances, the parts are secured against detachment. A release of the parts may, however, be effected by simply reversing the foregoing operation.

A member or other fastener element of this general type is to be secured to a unit which may be in the form of a sheet 16 as shown in Fig. 5. This sheet is formed with an aperture in line with the bore of the member and through which the end of the stud may be projected. The latter is, of course, mounted by a corresponding member or sheet which is to be secured against movement with respect to the sheet 16. In certain instances and due to the peculiarities of configuration of the parts or inaccuracies in mounting technique, the member and stud would not be capable of cooperating to best advantage should the both of them be rigidly secured against lateral displacement. It is preferred that only the collar member be capable of such lateral displacement. Therefore, in order to furnish a mounting in which this will be possible, and which will be consistent with the objects afore enumerated, it is preferred to employ a shell or housing of the type shown in Fig. 1. As therein illustrated this housing 18a may be formed of sheet metal and provide a deck portion or upper surface 18, the edges of which are defined by downwardly extending flanges 19—19x and 20—20x. The flange portions 19—19x are preferably straight. The flanges 20—20x are preferably bowed inwardly. As a consequence of such bowing, ear portions 21—21x extending beyond the flanges 20—20x may be of only minimum length, but will, at the same time, be formed with apertures 22—22x to receive fastening elements, and with adequate space provided for the manipulation and mounting of such elements. The deck or upper surface 18 is formed with an opening 23, the diameter of which is in excess of the diameter of the member body 10.

The lower face of the housing, as shown in Fig. 1, may be secured to a base plate 24a of the type particularly shown in Fig. 3. This plate includes a body 24 formed with projecting portions 25—25x, preferably of an identical contour to that of the ear portions 21—21x. The body 24 may be formed with an opening 26 of an area corresponding substantially to the area of the opening 17 formed in the sheet 16. Preferably, eyelet portions 27—27x are formed integral with the body 24 and within the projections 25—25x. The distance between these eyelets and their diameter is such that they may pass through the openings 22—22x in the ears 21—21x.

A base portion or flange 28 may be integral with or secured to the body of the fastener element. This base is formed with a pair of straight edge portions 29—29x and intermediate inwardly bowed or curved edge portions 30—30x. The degree of curvature of the latter should preferably be substantially identical with the degree of curvature of the flanges 20—20x. The distance between the opposite edges 30—30x is less than the distance between the opposite flanges 20—20x, and the distance between the opposite edges 29—29x is less than between the corresponding edges 19—19x of the shell.

Thus, a fastener element of the type shown in Fig. 2 may be received within the shell and with its body 10 projecting through the opening 23 thereof. The base 29 will be housed within the shell, and the parts will be secured against accidental displacement by applying the base plate 24a to the shell. In such application, the eyelets 27—27x or their equivalents are aligned with the openings 22—22x. Thereafter, they may be flattened as indicated by the numeral 31 in Fig. 5. This will prevent the shell from moving away from the base plate. At the same time, the collar member 10 will be similarly secured against movement in such a direction. However, this member will be free to shift within the limits defined by the shell and in lateral directions. Accordingly, should the parts not be in complete registry and as the stud element is projected into the bore of the member, it is obvious that the collar bore 9 of the latter will shift or adjust itself to be properly aligned with the stud member. This will result in these parts cooperating prefectly and without the operator's being even conscious of the fact that an adjustment has automatically occurred.

It is, of course, apparent that certain or all of the foregoing parts might be manufactured of any desired material and consistent with their embodying sufficient strength and lightness to achieve the desired results. As a consequence of this structure, a floating support or mounting for the collar member 10 or other element is provided. Also, a minimum amount of material is employed and the spacing between the ends of the ears is materially reduced. This is accomplished, however, without sacrificing any strength or making rivets such as 32, Fig. 5, difficult of application to the assembly for the purpose of securing them to the sheet or member 16. When the parts are subjected to tortional stress as in the case of application of the stud member to the collar member 10, it is apparent that adequate bearing surfaces will be provided by the edge portions 29—29x and 30—30x in cooperation with flanges 19—19x and 20—20x. Also as a consequence of the arcuate shaping of the side edges of the housing, maximum strength and resistance to torsional movement is achieved without any danger of deformation of the housing.

Thus, among others, the several objects of the invention as specifically afore noted are achieved. Obviously, numerous changes in construction and rearrangements of the parts might be resorted to without departing from the spirit of the invention as defined by the claims.

I claim:

1. A receptacle including, in combination, a housing including a central portion having an aperture therein, flanges extending downwardly from said central portion, at least two opposite flanges bowing inwardly, ear portions extending laterally from said bowing flanges, a collar element disposed within said housing and including a body having its end projecting through the aperture in the central portion of the body, a base affixed to said body, at least two opposite side edges of said base bowing to correspond substantially to the curvature of said bowing flanges, the distance between said bowing edges being less than the distance between the inner surfaces of said bowing flanges, and means on said ear portions for securing said receptacle to a support.

2. A receptacle member for use in a fastening device, said member comprising a substantially flat base plate having a substantially circular opening therein, a separate housing mounted on said base plate and provided with vertical side walls, at least two of said side walls bowing inwardly, the upper wall of said housing having a centrally-disposed, circular opening generally axially aligned with the opening in said base plate, means securing said base plate and housing together, an engaging member having a portion extending through the opening in said housing and provided with a substantially horizontally-disposed flange portion extending between said base plate and the upper wall of the housing, two of the opposed sides of said flange bowing inwardly to correspond with the inwardly-bowing side walls of said housing.

3. A receptacle member for use in a fastening device, said member comprising a substantially flat base plate having a substantially circular opening therein, a separate housing mounted on said base plate and provided with four vertical side walls and an upper wall providing an upstanding, centrally-disposed portion, two opposed side walls bowing inwardly from the corners of said housing, horizontally-disposed, substantially flat attaching ears extending from said bowing side walls, the upper wall of said housing having a centrally-disposed, substantially circular opening therein which is substantially axially aligned with the opening in said base plate, means for securing said base plate and housing together, an engaging member having a portion extending through the opening in said housing and provided with a substantially horizontally-disposed flange portion extending between the base plate and the upstanding portion of the housing, two opposed sides of said flange portion bowing inwardly to correspond with side walls of said housing, the base plate and the ears of the housing having aligned rivet openings for securing said receptacle to a member.

KARL EISELE.